US012611877B2

(12) United States Patent
Tsuchiya

(10) Patent No.: US 12,611,877 B2
(45) Date of Patent: Apr. 28, 2026

(54) PRINTER

(71) Applicant: TOSHIBA TEC KABUSHIKI KAISHA, Tokyo (JP)

(72) Inventor: Motohito Tsuchiya, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 114 days.

(21) Appl. No.: 18/429,483

(22) Filed: Feb. 1, 2024

(65) Prior Publication Data

US 2024/0316967 A1 Sep. 26, 2024

(51) Int. Cl.

*B41J 2/32* (2006.01)
*B41J 3/407* (2006.01)
*B41J 11/66* (2006.01)
*B41J 29/02* (2006.01)
*B41J 29/13* (2006.01)

(52) U.S. Cl.

CPC ................. *B41J 29/02* (2013.01); *B41J 2/32* (2013.01); *B41J 3/4075* (2013.01); *B41J 11/666* (2013.01); *B41J 29/13* (2013.01)

(58) Field of Classification Search

CPC ... B41J 2/32; B41J 2/325; B41J 3/4075; B41J 11/04; B41J 11/666; B41J 15/04; B41J 15/042; B41J 29/02; B41J 29/13

See application file for complete search history.

(56) References Cited

U.S. PATENT DOCUMENTS 5,447,380 A * 9/1995 Colonel .................... B41J 2/325 D18/50
8,553,055 B1 * 10/2013 Martell .................... B41J 2/355 347/192
10,773,528 B2 * 9/2020 Kawahara .............. B41J 3/4075
2007/0003354 A1 1/2007 Tamura et al.
2007/0212149 A1 * 9/2007 Ota .......................... B41J 17/32 400/208
2020/0130383 A1 4/2020 Takeda et al.

FOREIGN PATENT DOCUMENTS

JP 2009-107279 5/2009

OTHER PUBLICATIONS

Extended European Search Report for European Patent Application No. 24158931.6 dated Jun. 14, 2024.

* cited by examiner

*Primary Examiner* — Anh T Vo

(74) *Attorney, Agent, or Firm* — Amin, Turocy & Watson, LLP

(57) ABSTRACT

A printer includes: a paper holding unit holding a roll paper; a printing unit printing on the paper pulled out from the paper holding unit; and a box-shaped casing housing the paper holding unit and the printing unit, the casing includes: a plate-shaped cover portion; and a main body portion being a portion other than the cover portion, wherein, in an attaching structure in which the cover portion is detachably attached to the main body portion, the cover portion can be attached in any direction where one of a first surface being one surface of the plate-shaped cover portion and a second surface being the other surface in a direction faces the main body portion, and the cover portion has a supporting portion detachably supporting an optional unit performing a predetermined process on the paper in any one of the first surface or the second surface.

20 Claims, 13 Drawing Sheets

PRINTER

CROSS-REFERENCE TO RELATED APPLICATION

This application is based upon and claims the benefit of from Japanese Patent Application No. 2023-048194, priority filed on Mar. 24, 2023, the entire contents of which are incorporated herein by reference.

FIELD

Embodiments described herein relate generally to printers.

BACKGROUND

In the related art, printers have been used to print on a paper drawn from a roll paper and issue the printed paper (for example, Patent Literature 1). For such printers, a standard model is a model in which the paper outputs in a strip shape without cutting or peeling, and in some cases, the selling method that is to provide functions such as cutting and peeling as an option that can be attached to the standard model may be taken.

If a plurality of models are developed using the method described above, a structure is required to enable options to be attached and detached. The members realizing this structure are generally prepared separately, together with optional units, rather than as necessary members to enable a standard model printer to function.

It is not preferable if there are members that need to be prepared separately in addition to the optional units, because the cost of materials and the cost requiring the manufacturing increase, and the management of the members is also required.

DETAILED DESCRIPTION

The problem to be solved by the present invention is to provide a printer which can realize a structure of enabling a unit for providing optional functions to be detachable with a structure included in a standard model.

In general, according to one embodiment, a printer includes: a paper holding unit holding a roll paper wrapped in a strip-shaped paper; a printing unit printing on the paper pulled out from the paper holding unit; and a box-shaped casing housing the paper holding unit and the printing unit, wherein the casing includes: a plate-shaped cover portion constituting at least a portion of a surface provided with a paper discharge port for discharging the paper after printing; and a main body portion being a portion other than the cover portion, wherein, in an attaching structure in which the cover portion is detachably attached to the main body portion, the cover portion can be attached in any direction where one of a first surface being one surface of the plate-shaped cover portion and a second surface being the other surface in a direction faces the main body portion, and wherein the cover portion has a supporting portion detachably supporting an optional unit performing a predetermined process on the paper in any one of the first surface or the second surface.

Figure 1:
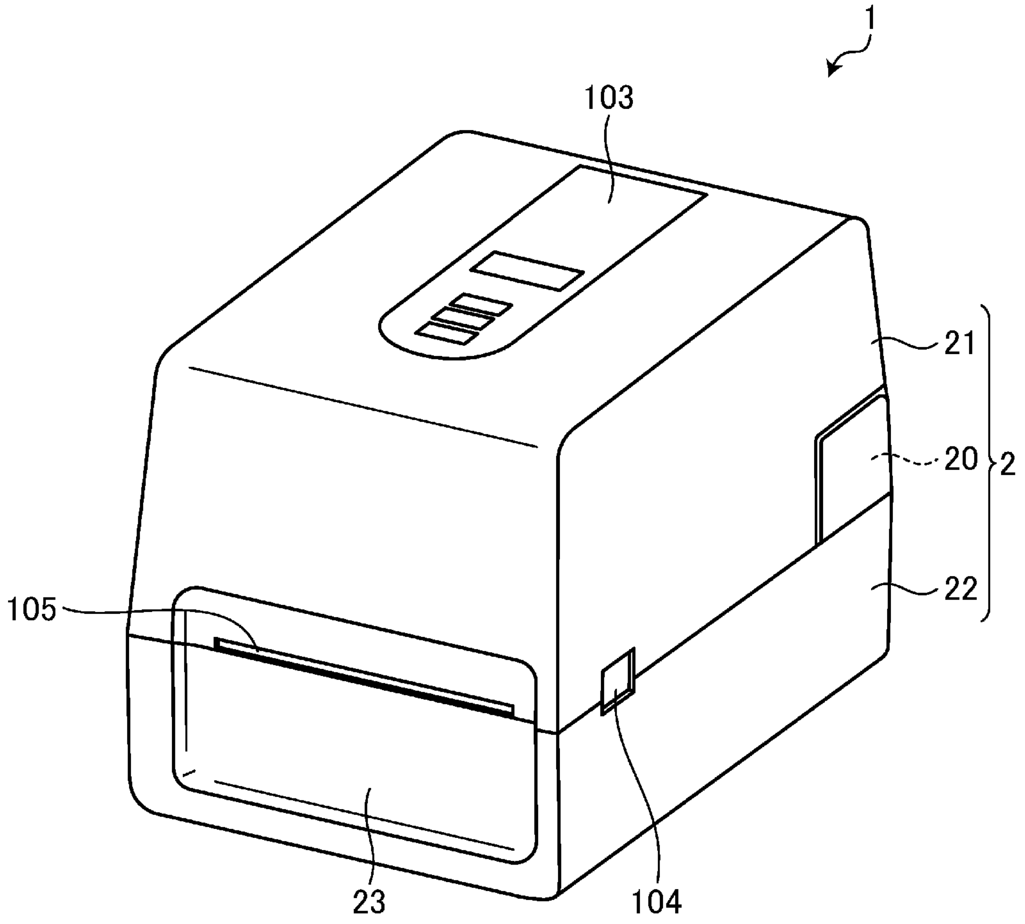
FIG. 1 is a diagram illustrating an example of an outer appearance of a printer in a standard state according to an embodiment.
Figure 2:
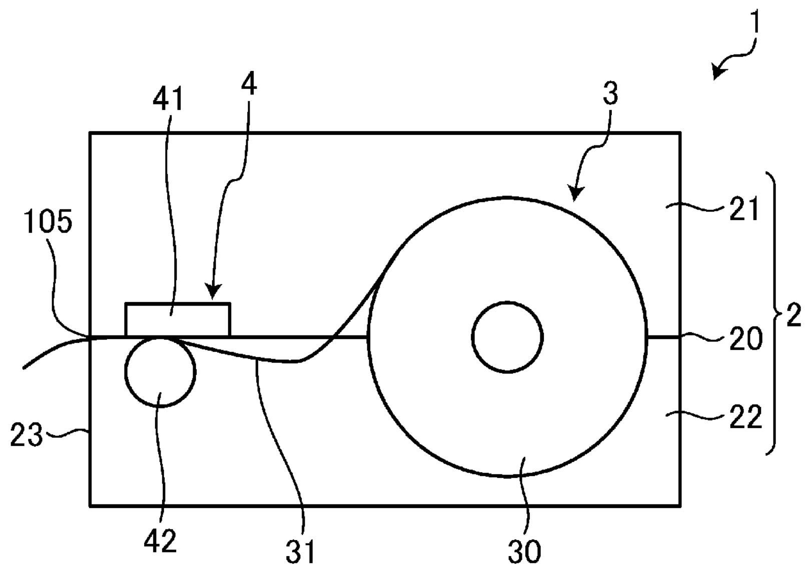
FIG. 2 is a diagram illustrating an example of an internal structure of the printer.

Embodiments will be described with reference to the drawings. FIG. 1 is a diagram illustrating an example of an outer appearance of a printer 1 in a standard state according to an embodiment. FIG. 2 is a diagram illustrating an example of an internal structure of the printer 1.

The printer 1 is an example of a standard model printer, and includes a casing 2, a display operation portion 103, an open/close button 104, and a paper discharge port 105. The side where the paper discharge port 105 is provided is a front surface side of the printer 1, and a side opposite to a surface where the paper discharge port 105 is provided is a rear side.

The casing 2 is a box-shaped container and includes an upper casing 21 and a lower casing 22. The upper casing 21 has a downward opening, and the lower casing 22 has an upward opening. The upper casing 21 is rotatable and attached to the lower casing 22 by a hinge 20 at the rear side. Accordingly, the upper casing 21 and the lower casing 22 are rotatable and connected, and open and close openings thereof as the upper casing 21 and lower casing 22 rotate.

The hinge 20 is rotatable and connects the upper casing 21 and the lower casing 22 on the rear side. The hinge 20 includes a biasing member such as a torsion spring on one side of the lower casing 22 in the width direction. The biasing member biases the upper casing 21 in the direction in which the lower casing 22 is opened, so as to slow the movement of the upper casing 21 when closing the lower casing 22.

A paper holding unit 3 and a printing unit 4 are provided inside the casing 2. The paper holding unit 3 is rotatable and holds a roll paper 30 in which a strip-shaped paper 31 is wrapped.

As the roll paper 30, a receipt roll and a label roll may be exemplified. The receipt roll is a roll wrapped by a strip-shaped receipt paper (an example of the paper 31). The receipt paper is a strip-shaped paper 31 that becomes a receipt by being printed and cut.

The label roll is a roll wrapped by a strip-shaped label paper (an example of the paper 31). The label paper includes labels with a mount in which a label is pasted to a strip-shaped mount and labels without a mount. It is noted that the label has an adhesive layer provided on the rear side of the printed surface.

The printing unit 4 prints on the paper 31 while conveying the paper 31 pulled out from the paper holding unit 3 and includes a print head 41 and a platen roller 42. The print head 41 is fixed to an inner surface of the upper casing 21 and is in close contact with the platen roller 42 with the upper casing 21 closing the opening on the upper surface of the lower casing 22.

The print head 41 is, for example, a thermal head and includes a plurality of heating elements arranged in parallel. The print head 41 prints on the paper 31 interposed between the print head 41 and the platen roller 42 by using heat from a heating element. The platen roller 42 rotates by a driving force of the stepping motor being transmitted and conveys the paper 31 interposed between the platen roller 42 and the print head 41.

The display operation portion 103 is provided on the upper surface of the upper casing 21. The display operation portion 103 receives input of various operations and displays various information. The open/close button 104 is provided in the front side of the side surface porn of the upper casing 21. If the open/close button 104 is pressed, a lock state of the structure holding the upper casing 21 at the position where the lower casing 22 is closed is released, the upper casing 21 is lifted according to the bias of the bias member, and the casing 2 is opened.

A portion of the front surface of the lower casing 22 is configured with a front cover 23. The front cover 23 is an example of the cover portion. In addition, the other portions of the casing 2 except for the front cover 23 are an example of the main body portion.

The paper discharge port 105 is an opening for issuing (discharging) printed matter such as a receipt (paper 31 after printing) and is provided between the upper end of the front cover 23 and the lower end of the front surface of the upper casing 21.

Figure 3:
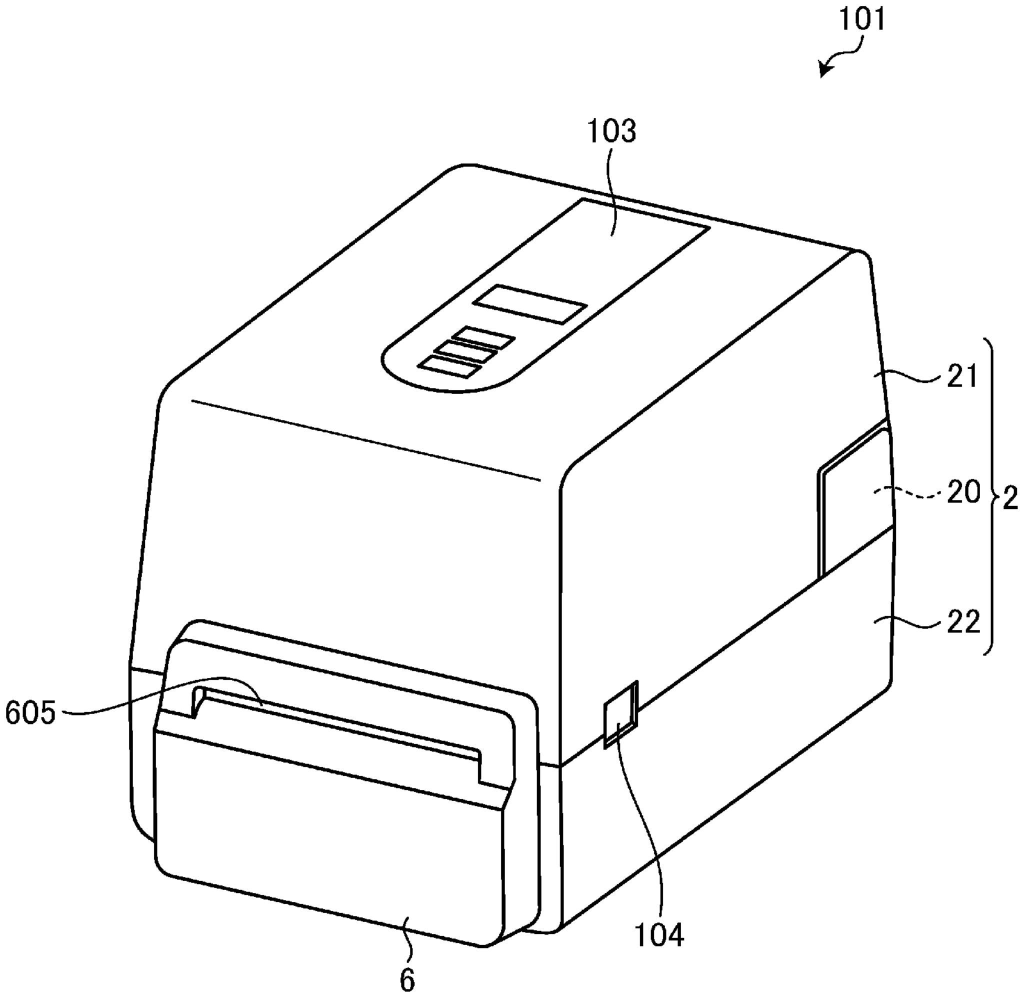
FIG. 3 is a diagram illustrating an example of the outer appearance of the printer with a cutting unit.
Figure 4:
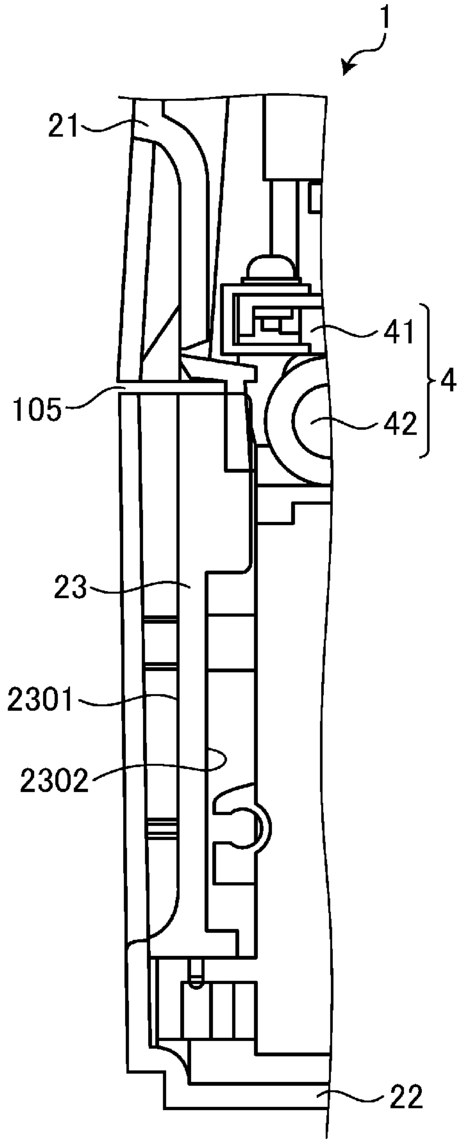
FIG. 4 is a diagram illustrating an example of a structure of a portion of the printer including the front cover.
Figure 5:
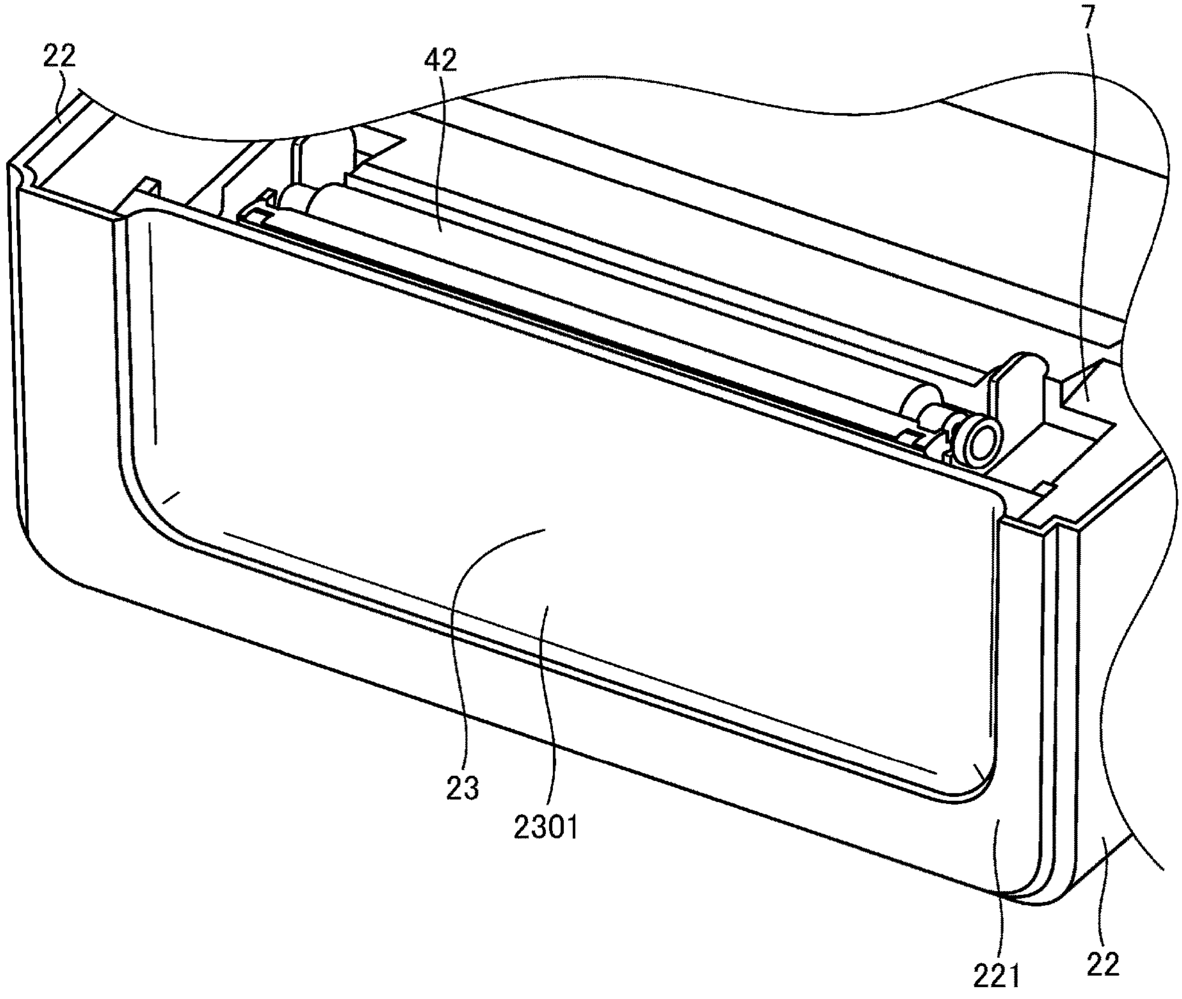
FIG. 5 is a diagram illustrating an example of a structure of a portion of the printer including a front cover.

FIG. 3 is a diagram illustrating an example of the outer appearance of a printer 101 with the cutting unit. The printer 1 illustrated in FIG. 1 of this embodiment is in the standard state. By attaching the cutting unit 6 to the front surface of the printer 1 in the standard state, the printer 101 with the cutting unit can be obtained. The cutting unit 6 is an example of an optional unit that performs predetermined processing on the paper 31. To attach the cutting unit 6, the front cover 23 of the printer 1 in the standard state is used by turning it over.

Figure 6:
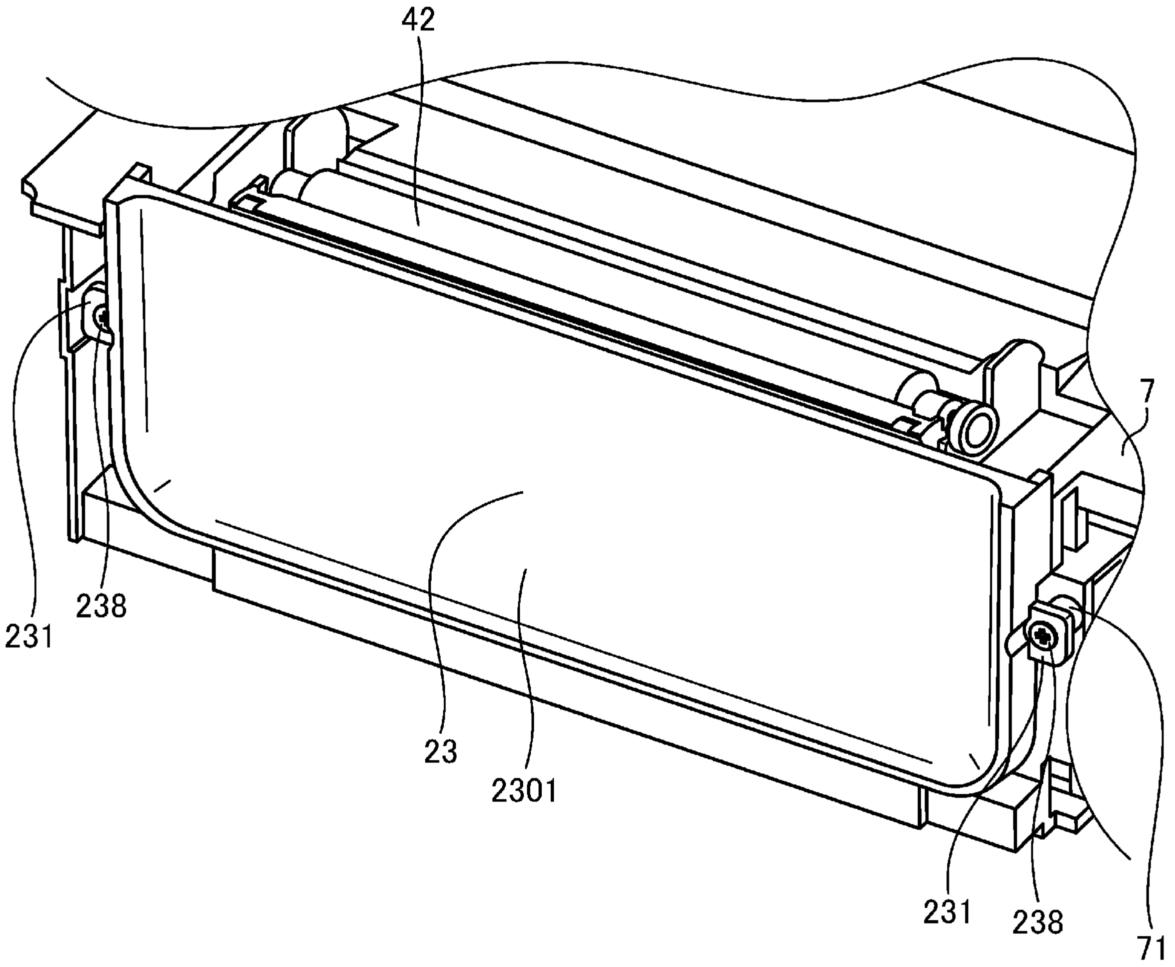
FIG. 6 is a diagram illustrating a state illustrated in FIGS. 4 and 5 with a casing removed.
Figure 7:
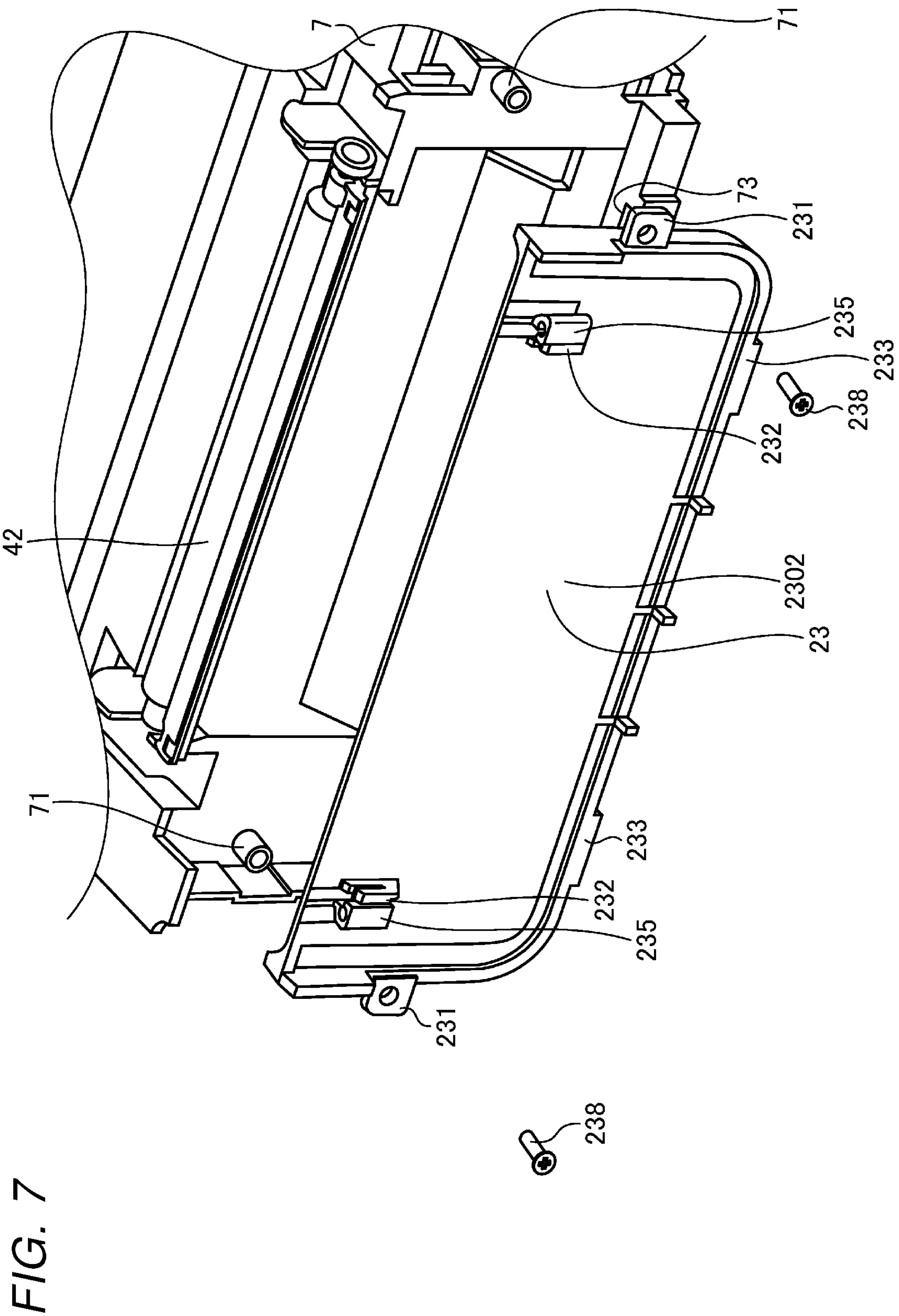
FIG. 7 is a diagram illustrating a state in which the front cover is removed from the state illustrated in FIG. 6 and turned over so that a supporting portion faces outward.
Figure 8:
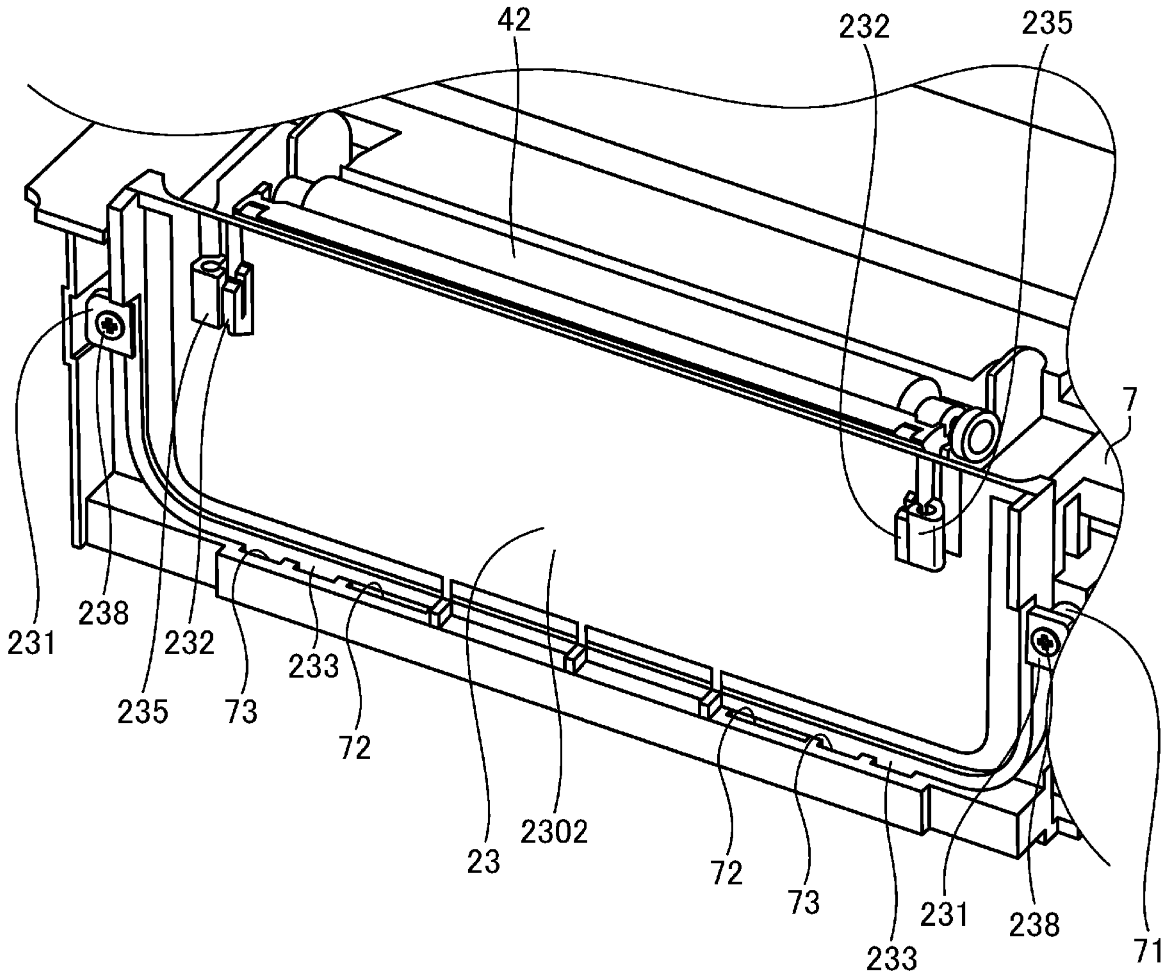
FIG. 8 is a diagram illustrating a state in which the front cover with the supporting portion tabulated is attached.

FIGS. 4 to 8 are diagrams illustrating examples of a structure of a portion of the printer 1 including the front cover 23. FIG. 6 illustrates a state in which the lower casing 22 is removed from the state in FIGS. 4 and 5. In addition, FIG. 7 illustrates the state in which the front cover 23 is removed from the state in FIG. 6 and turned over so that a supporting portion 232 (described later) faces up. FIG. 8 illustrates a state in which the front cover 23 with the supporting portion 232 tabulated is attached.

The front cover 23 of the printer 1 in the standard state is attached to the frame 7 with a first surface 2301 facing the front surface. A front portion 221 of the lower casing 22 is formed into the U-shaped hollowed out shape, and the front cover 23 is arranged so as to be fitted into the hollowed out portion.

The front cover 23 has attaching tabs 231 on both sides. The attaching tab 231 has the hole penetrating the shaft of the screw 238. Furthermore, the cylindrical screw receiving portion 71 is provided in the protruding manner at the position corresponding to the attaching tab 231 on the front surface of the frame 7 (refer to FIG. 7).

The attaching tab 231 and the screw receiving portion 71 constitute an example of the attaching structure. The attaching structure is a structure for detachably attaching the front cover 23. In this attaching structure, any one of the first surface 2301 that is one surface of the plate-shaped front cover 23 and a second surface 2302 that is the other surface can be attached even in the direction facing the front surface. In other words, the above-mentioned attaching structure can allow the front cover 23 to be attached and detached by turning the inside and the outside of the front cover 23 inside out.

It is noted that the frame 7 supports portions built into the printer 1 and positions the portions at predetermined positions and is provided at a position hidden by the front portion 221 of the lower casing 22. The frame 7 is rotatable, supports, for example, both ends of the platen roller 42, and maintains the platen roller 42 at a predetermined position.

In addition, the front cover 23 has a protrusion 233 (portions constituting the attaching structure) at two locations on the lower side portion (refer to FIG. 7). In addition, a groove-shaped recess 73 (portion constituting the attaching structure) is formed at the position in the frame 7 which the lower side of the front cover 23 is in contact with (refer to FIG. 8). By inserting the protrusion 233 into the recess 73, the lower side of the front cover 23 is fixed to the frame 7.

As illustrated in FIG. 6, the front cover 23 is fixed to the frame 7 by inserting the protrusion 233 into the recess 73, allowing the shaft of the screw 238 to penetrate the hole of the attaching tab 231, and being screwed into the screw receiving portion 71. From this state, if the screws 238 are removed and the front cover 23 separated from the frame 7 is turned over, the state illustrated in FIG. 7 is obtained. In this state, instead of the first surface 2301, the second surface 2302 which is the rear surface of the first surface 2301 faces the front surface. In addition, from this state, if the protrusion 233 is inserted into the recess 73, the front cover 23 is superimposed on the frame 7, and if the attaching tab 231 is fixed to the screw receiving portion 71 with the screw 238, the state illustrated in FIG. 8 is obtained.

The supporting portion 232 is provided on the second surface 2302 of the front cover 23. The supporting portion 232 is the hook-shaped portion and supports the cutting unit 6 in the hooked state. In addition, the screw receiving portion 235 is provided on the second surface 2302 adjacent to the supporting portion 232. The screw receiving portion 235 is a portion of a deviation suppressing portion, and constitutes the deviation suppressing portion together with the screw 239, which will be described later. The direction in which the screws are inserted into the screw receiving portion 235 is from top to bottom. By this same movement from top to bottom, a hook portion 631 (refer to FIG. 9, described later) provided in the cutting unit 6 is hooked and held by the supporting portion 232.

Figure 9:
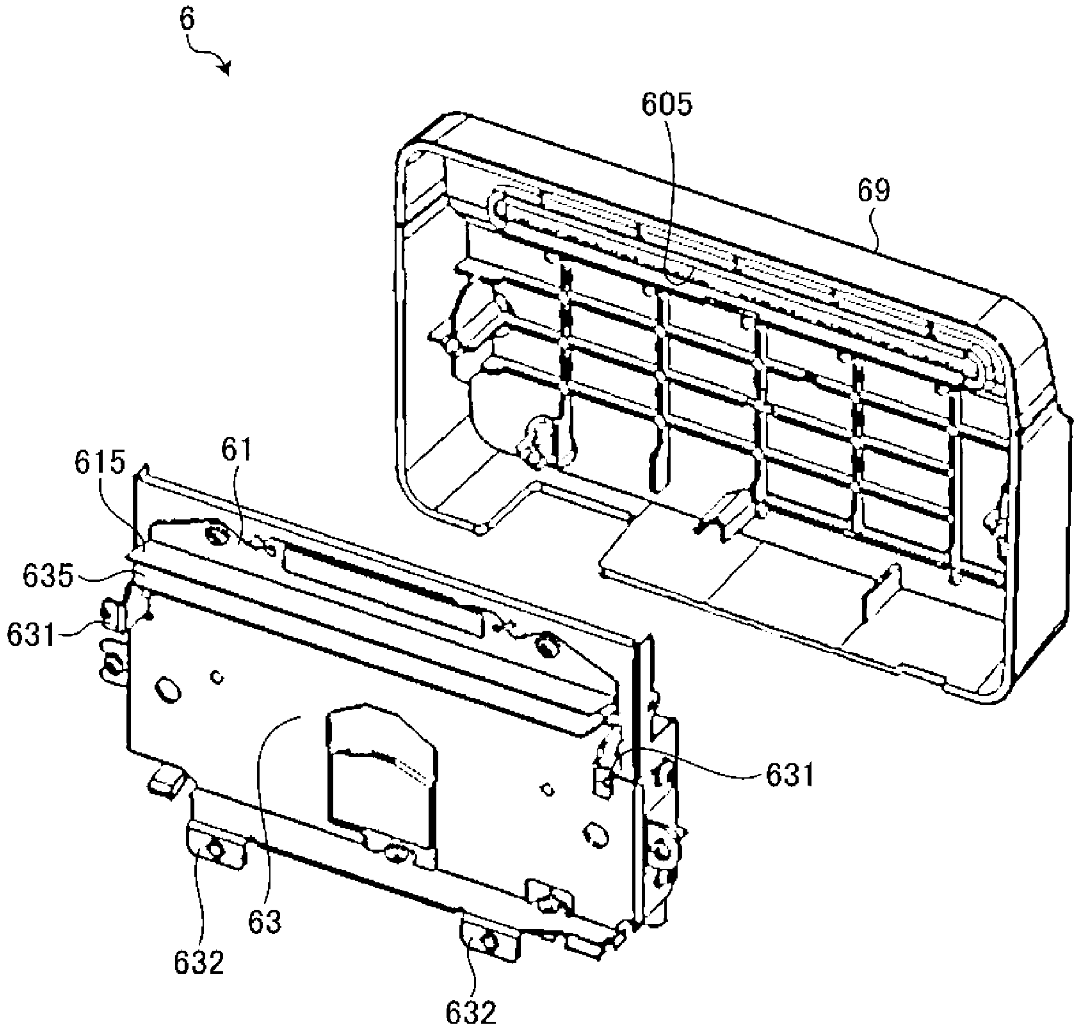
FIG. 9 is an exploded perspective view illustrating an example of a structure of the cutting unit.
Figure 10:
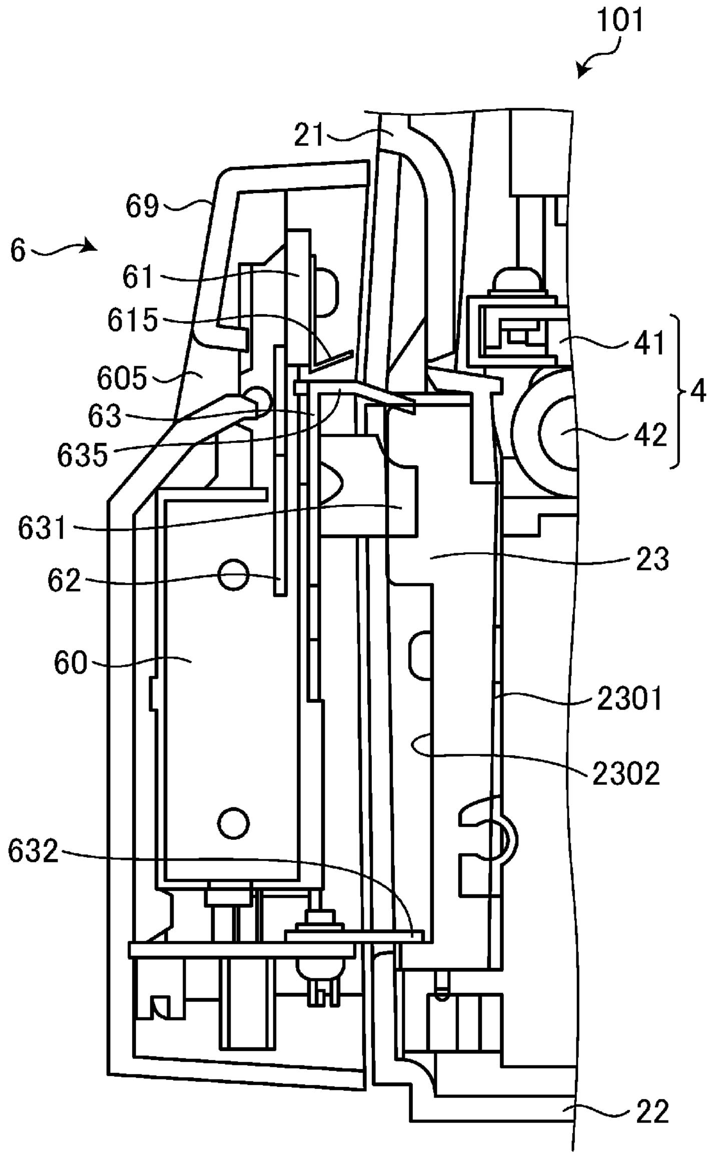
FIG. 10 is a diagram illustrating an example of a structure of a portion including the front cover of the printer with the cutting unit.

FIG. 9 is an exploded perspective view illustrating an example of the structure of the cutting unit 6. FIG. 10 is a diagram illustrating an example of the structure of the portion of the printer with the cutting unit 101 including the front cover 23. It is noted that the cutting unit 6 illustrated in FIG. 9 is viewed from the rear side.

The cutting unit 6 includes a drive portion 60, a fixed blade 61, a movable blade 62, a bracket 63, a cover 69, and the like. The drive unit 60 includes the motor, the link, and the like, and moves the movable blade 62 up and down. The fixed blade 61 cooperates with the movable blade 62 that moves up and down to interpose and cut the paper 31.

It is noted that the cutting unit 6 may perform full cut in which the paper 31 is cut across the entire width thereof or may perform partial cut in which a portion of the paper 31 in the width direction is left uncut. Furthermore, the manner of movement of the movable blade 62 moves with respect to the fixed blade 61 in the cutting unit 6 is not limited to vertical movement as in this embodiment.

The bracket 63 is a plate-shaped member constituting the rear side of the drive unit 60 and being provided with a hook portion 631 and a protrusion 632. The hook portion 631 is an example of a supported portion.

The hook portion 631 is an L-shaped portion protruding from the rear surface of the cutting unit 6 and being hooked onto the supporting portion 232. The hook portion 631 is formed, for example, by raising a portion of the metal plate constituting the rear surface of the cutting unit 6 at the substantially right angle from the rear surface and further bending a leading end portion at the substantially right angle.

The protrusion 632 is a portion protruding downward from the lower portion of the metal plate constituting the rear surface of the cutting unit 6. The protrusion 632 is inserted into the recess 72 (refer to FIG. 8) provided in the frame 7. The recess 72 is provided at the position adjacent to the recess 73. By inserting the protrusion 632 into the recess 72, the lower portion of the cutting unit 6 is fixed to the frame 7.

The cover 69 is an exterior of the cutting unit 6 covering the above-mentioned portions (drive portion 60, fixed blade 61, movable blade 62, bracket 63, and the like) and has a paper discharge port 605 formed therein. The paper discharge port 605 is located on an extension line along the traveling direction of the paper 31 discharged from the paper discharge port 105.

It is noted that the fixed blade 61 has a guide portion 615, and the bracket 63 has a guide portion 635. The guide portion 615 and the guide portion 635 are located upstream of the paper discharge port 605 and face the upper surface and the lower surface of the paper 31 to guide the paper 31 to the paper discharge port 605.

Figure 11:
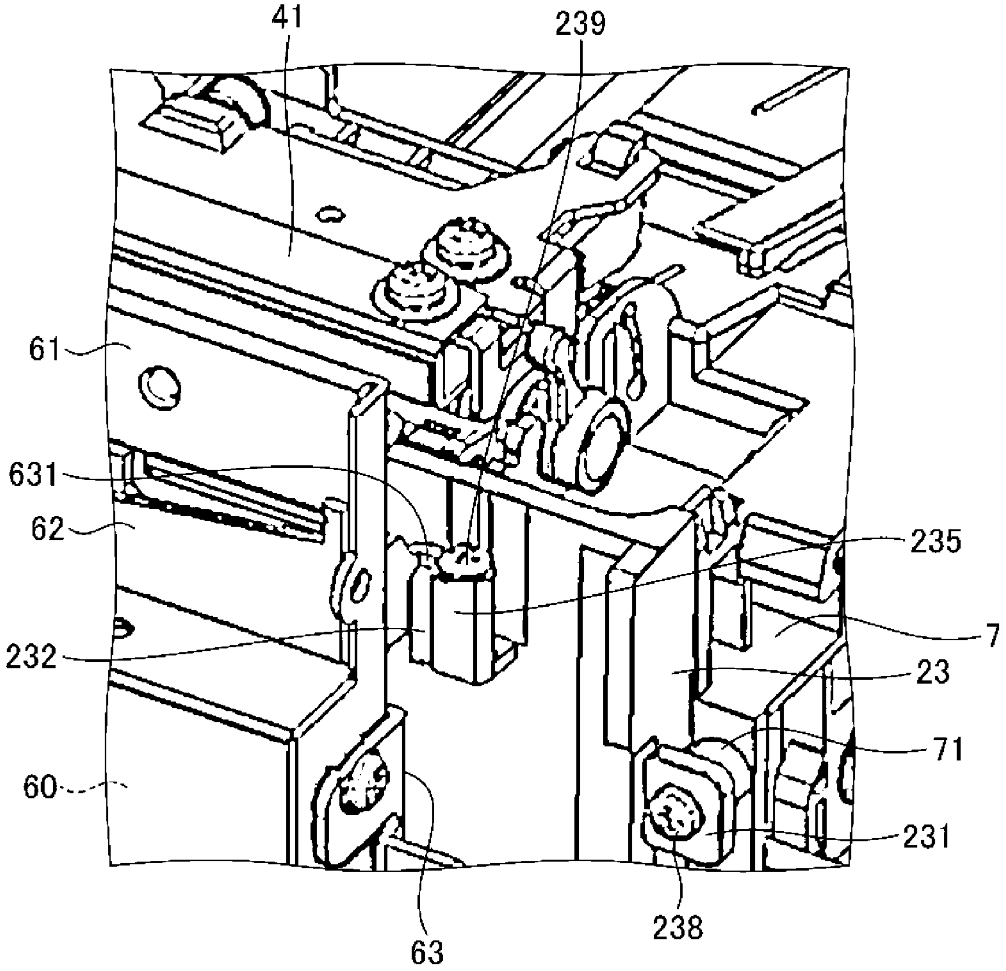
FIG. 11 is a diagram illustrating a state in which the cutting unit is supported by the supporting portion.
Figure 12:
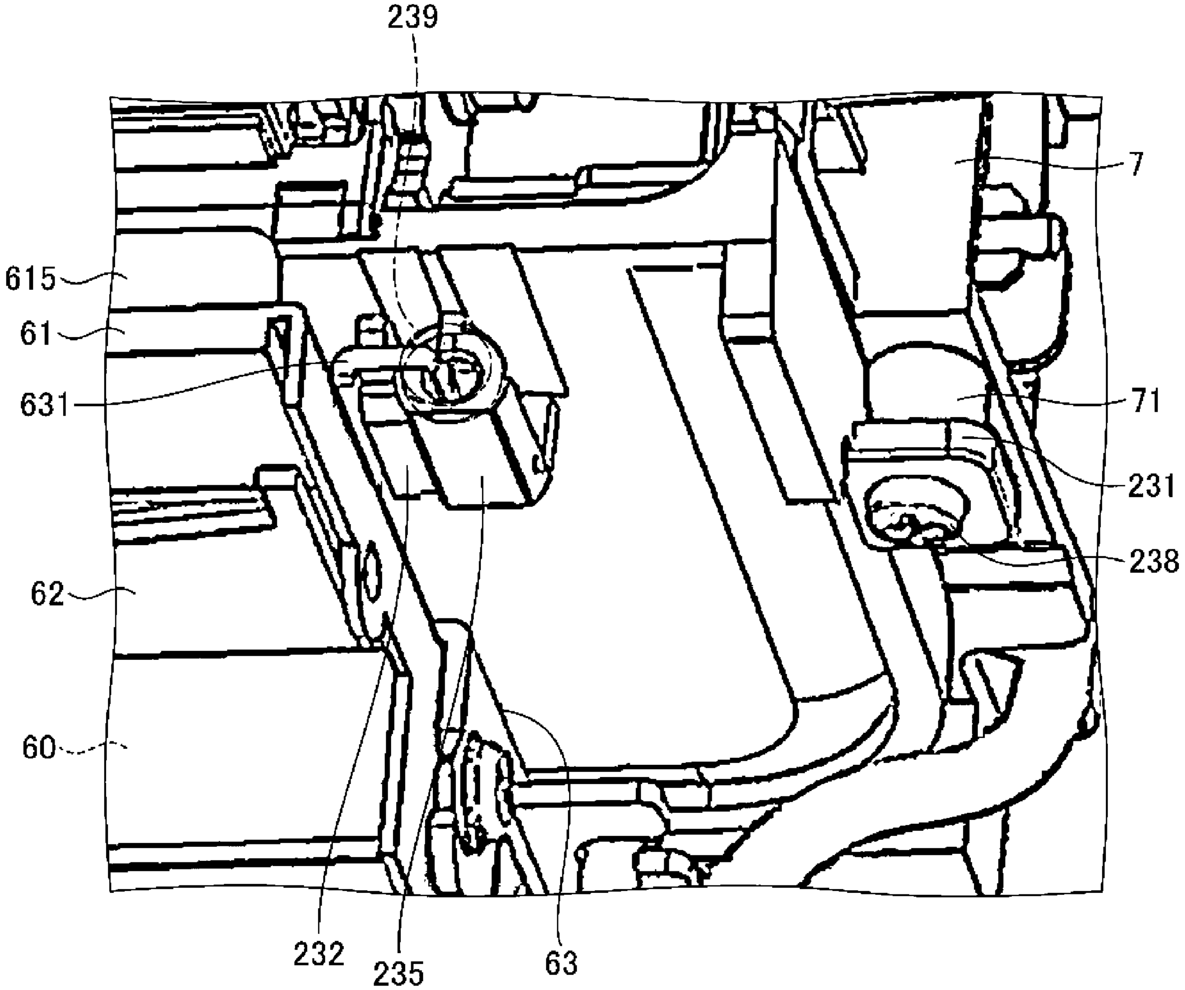
FIG. 12 is a diagram illustrating a state in which the cutting unit is supported by the supporting portion.

FIGS. 11 and 12 are diagrams illustrating a support state of the cutting unit 6 by the supporting portion 232. FIG. 12 illustrates the state viewed diagonally downward from the position slightly higher than that in FIG. 11.

The hook portion 631 is supported in the state of being hooked by the supporting portion 232 by being positioned on the supporting portion 232 and being moved downward. After being hooked, since the hook portion 631 is hold down so that the hook portion 631 does not fall out from the supporting portion 232, the screw 239 is used. The screw 239 is a portion of the deviation suppressing portion and constitutes the deviation suppressing portion together with the above-mentioned screw receiving portion 235. The screw 239 is screwed into the screw receiving portion 235 provided adjacent to the supporting portion 232. This screwing direction is from top to bottom. The shaft portion of the screw 239 that has been screwed in is screwed into the screw receiving portion 235, and the head thereof is located above the screw receiving portion 235.

The positions and dimensions of the hook portion 631, the supporting portion 232, and the screw receiving portion 235 are designed such that the head of the screw 239 screwed into the screw receiving portion 235 covers the end of the hook portion 631 hooked and supported by the supporting portion 232. Due to such positions and dimensions, the hook portion 631 hooked and supported by the supporting portion 232 is pressed at least at the end of the hook portion 631 by the head of the screw 239. Accordingly, if the screw 239 is screwed into the screw receiving portion 235, since the hook portion 631 cannot be moved upward, the hook portion 631 does not come off from the supporting portion 232.

As described above, after the cutting unit 6 is attached to the frame 7, the printer 101 with the cutting unit is configured by covering it again with the lower casing 22. It is noted that, when removing the cutting unit 6 from the printer 1, the above-mentioned procedure is reversed. That is, the lower casing 22 is peeled off to expose the frame 7, the cutting unit 6 is removed by removing the screws 239, the front cover 23 is removed except for the screws 238, turned over and reattached, and the lower casing 22 is re-covered.

Figure 13:
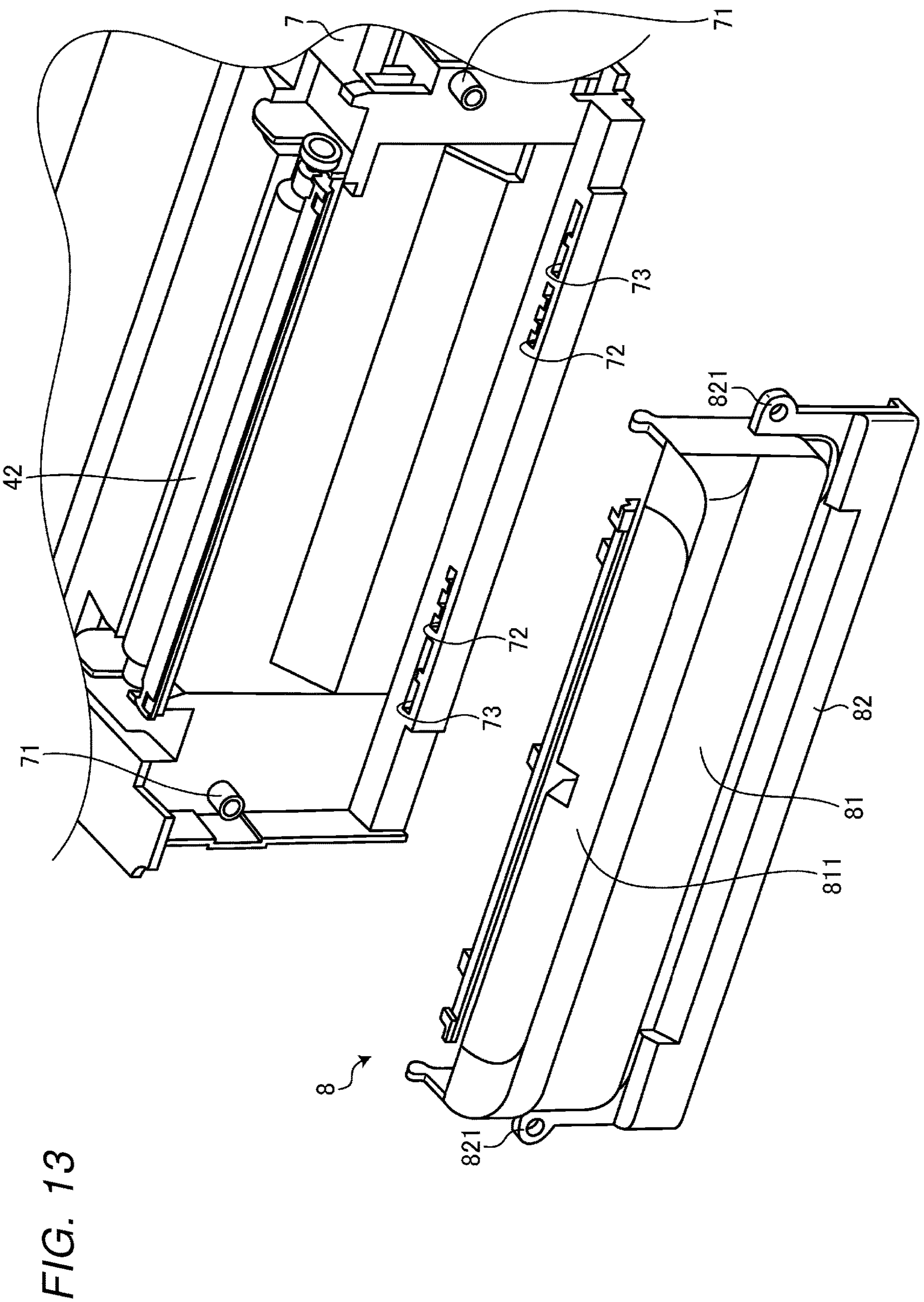
FIG. 13 is a diagram illustrating a positional relationship with respect to a peeling unit and a frame of the peeling unit.
Figure 14:
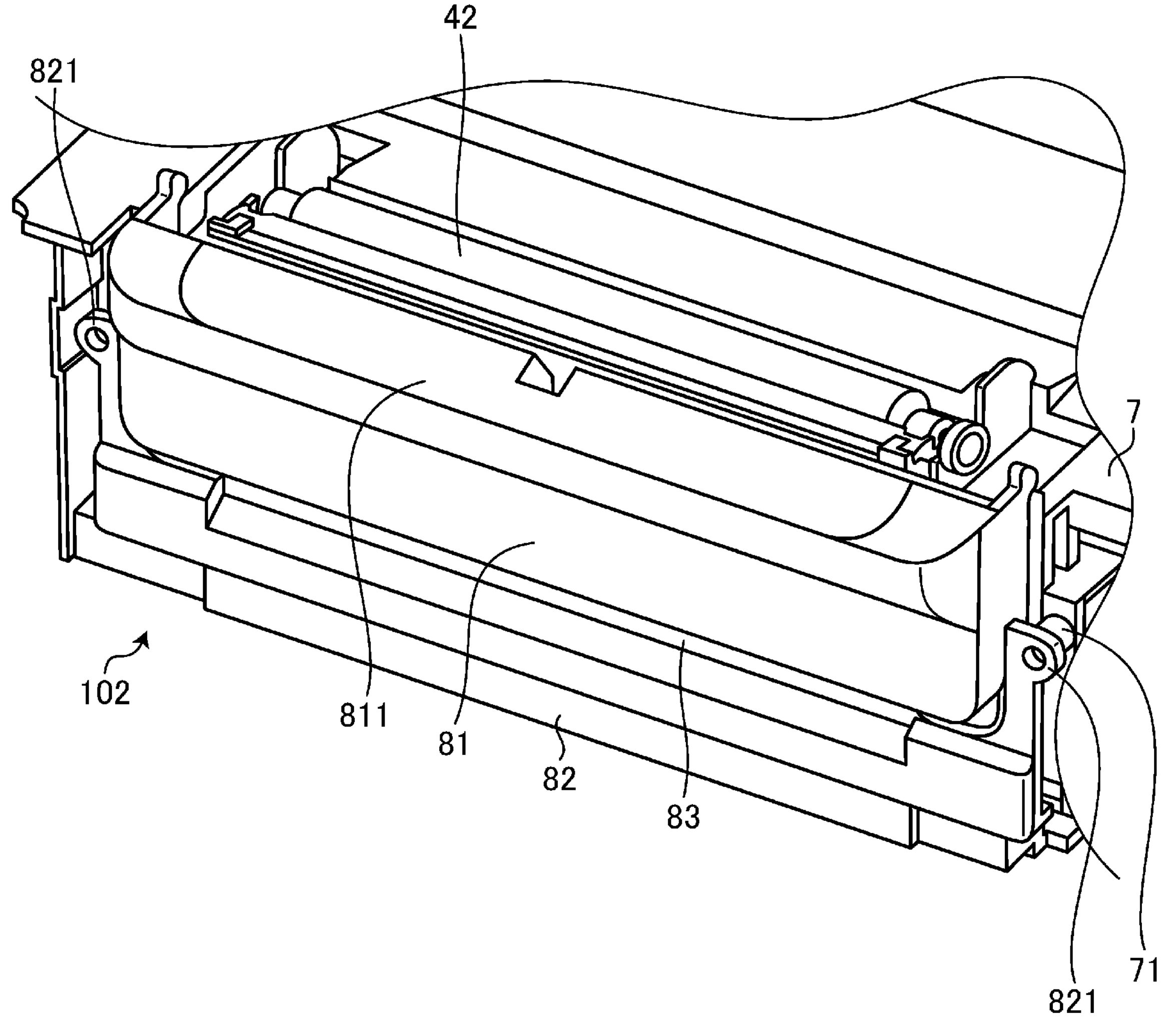
FIG. 14 is a diagram illustrating an example of a printer with a peeling unit, in a state of the lower casing removed.

FIG. 13 is a diagram illustrating the peeling unit 8 and the positional relationship of the peeling unit 8 with respect to the frame 7. FIG. 14 is a diagram illustrating an example of the printer 102 with the peeling unit, with the lower casing 22 removed.

The peeling unit 8 is another example of an optional unit. The peeling unit 8 is used if the paper 31 is a strip-shaped mount with the label pasted thereon, and if it is desired to issue the label that is peeled off from the mount. In other words, the peeling unit 8 peels the label from the mount as the label is conveyed after printing.

The peeling unit 8 has a first member 81 and a second member 82. The first member 81 is provided adjacent to the downstream side of the platen roller 42, the second member 82 is a portion fixed to the frame 7, and is rotatable and supports the first member 81. The rotation direction of the first member 81 is the direction in which the first member 81 approaches and separates from the platen roller 42, and as the first member 81 rotates, the first member 81 moves between the position close to the platen roller 42 and the position away from the platen roller 42. The axis of rotation is substantially parallel to the platen roller 42.

The first member 81 interposes the mount between the first member 81 and the platen roller 42 at the position close to the platen roller 42. The leading end of the mount is taken outside the casing 2 from between a mount discharge port 83 which is the gap between the first member 81 and the second member 82. In addition, the first member 81 includes a label receiving portion 811 supporting the peeled label from below. The label receiving portion 811 is a surface that is processed to prevent the adhesive surface of the label from sticking (such as forming unevenness or coating with fluororesin).

When attaching this peeling unit 8 to the frame 7, the front cover 23 is unnecessary, and thus is removed.

The second member 82 has the attaching tabs 821 at both ends in the width direction. The attaching tab 821 is provided at the position corresponding to the screw receiving portion 71 of the frame 7 and has the hole which the shaft portion of the screw 238 penetrates. The second member 82 is fixed to the frame 7 by the shaft portion of the screw 238 penetrating the hole in the attaching tab 821 and being screwed into the screw receiving portion 71.

It is noted that the second member 82 has a downwardly protruding protrusion at its lower portion. This protrusion is a portion corresponding to the protrusion 632 of the cutting unit 6 and is inserted into the recess 72 (refer to FIG. 8) provided in the frame 7. By inserting the protrusion of the peeling unit 8 into the recess 72, the lower portion of the peeling unit 8 is fixed to the frame 7.

As described above, according to the printer 1 of this embodiment, the structure for enabling the cutting unit 6 to be detachable can be realized by the front cover 23 and the surroundings constituting a portion of the casing 2 of the standard model printer 1.

In addition, according to the present embodiment, by providing the deviation suppressing portion, a simple support state where the supported portion (hook portion 631) provided on the optional unit is hooked to the hook-shaped supporting portion 232 provided on one surface of the front cover 23 can be suppressed from being unexpectedly released due to misalignment.

In addition, according to the present embodiment, since the deviation suppressing portion is configured with the screw receiving portion 235 and the screw 239, the simple structure is easy to install, and the installation space can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer, comprising:

a paper holding component holding a roll paper wrapped in a strip-shaped paper;

a printing component printing on the roll paper pulled out from the paper holding component; and a box-shaped casing housing the paper holding component and the printing component, wherein the box-shaped casing includes:

a plate-shaped cover portion constituting at least a portion of a surface provided with a paper discharge port for discharging the roll paper after printing; and a main body portion being a portion other than the cover portion, wherein, in an attaching structure in which the cover portion is detachably attached to the main body portion, the cover portion is configured to be reversibly attached in which one of a first surface being one surface of the plate-shaped cover portion and a second surface being an other surface of the plate-shaped cover portion faces the main body portion, and wherein the cover portion has a supporting portion detachably supporting an optional component performing a predetermined process on the roll paper in one of the first surface or the second surface.

2. The printer according to claim 1, wherein the supporting portion has a hook-like shape, wherein the optional component has a supported portion having the hook-like shape supported in a state of being hooked by the supporting portion, and wherein a deviation suppressing portion for suppressing deviation due to movement in a direction of releasing the hook-like state between the supporting portion and the supported portion is further provided adjacent to the supporting portion.

3. The printer according to claim 2, wherein the deviation suppressing portion is configured with a screw and a screw receiving portion into which the screw is screwed, and wherein a head of the screw screwed into the screw receiving portion is located at a position being in contact with the supported portion supported in the state of being hooked by the supporting portion and preventing movement of the supported portion.

4. The printer according to claim 3, wherein a screwing direction of the screw into the screw receiving portion is a direction substantially opposite to a moving direction if the supported portion hooked on the supporting portion moves away from the supporting portion.

5. The printer according to claim 1, wherein the optional component performs a cutting process on the roll paper.

6. The printer according to claim 1, wherein the optional component is a cutting component including a driver, a fixed blade, a movable blade, a bracket, and a cover.

7. The printer according to claim 6, wherein the driver moves the movable blade up and down.

8. The printer according to claim 1, wherein the cutting component performs a full cut in which the roll paper is cut across an entire width thereof.

9. The printer according to claim 1, wherein the cutting component performs a partial cut in which a portion of the roll paper in a width direction is left uncut.

10. The printer according to claim 1, wherein the optional component performs peeling a label from a mount as the label is conveyed after printing.

11. A thermal printer, comprising:

a paper holding component holding a roll paper wrapped in a strip-shaped paper;

a thermal printing component printing on the roll paper pulled out from the paper holding component; and a box-shaped casing housing the paper holding component and the thermal printing component, wherein the box-shaped casing includes:

a plate-shaped cover portion constituting at least a portion of a surface provided with a paper discharge port for discharging the roll paper after thermal printing; and a main body portion being a portion other than the cover portion, wherein, in an attaching structure in which the cover portion is detachably attached to the main body portion, the cover portion is configured to be reversibly attached in which one of a first surface being one surface of the plate-shaped cover portion and a second surface being an other surface of the plate-shaped cover portion faces the main body portion, and wherein the cover portion has a supporting portion detachably supporting an optional component performing a predetermined process on the roll paper in one of the first surface or the second surface.

12. The thermal printer according to claim 11, wherein the supporting portion has a hook-like shape, wherein the optional component has a supported portion having the hook-like shape supported in a state of being hooked by the supporting portion, and wherein a deviation suppressing portion for suppressing deviation due to movement in a direction of releasing the hook-like state between the supporting portion and the supported portion is further provided adjacent to the supporting portion.

13. The thermal printer according to claim 12, wherein the deviation suppressing portion is configured with a screw and a screw receiving portion into which the screw is screwed, and wherein a head of the screw screwed into the screw receiving portion is located at a position being in contact with the supported portion supported in the state of being hooked by the supporting portion and preventing movement of the supported portion.

14. The thermal printer according to claim 13, wherein a screwing direction of the screw into the screw receiving portion is a direction substantially opposite to a moving direction if the supported portion hooked on the supporting portion moves away from the supporting portion.

15. The thermal printer according to claim 11, wherein the optional component performs a cutting process on the roll paper.

16. The thermal printer according to claim 11, wherein the optional component is a cutting component including a driver, a fixed blade, and a movable blade.

17. The thermal printer according to claim 16, wherein the driver moves the movable blade up and down.

18. The thermal printer according to claim 16, wherein the cutting component performs a full cut in which the roll paper is cut across an entire width thereof.

19. The thermal printer according to claim 16, wherein the cutting component performs a partial cut in which a portion of the roll paper in a width direction is left uncut.

20. The thermal printer according to claim 11, wherein the optional component performs peeling a label from a mount as the label is conveyed after thermal printing.

* * * * *